(12) United States Patent
Jansen et al.

(10) Patent No.: US 6,398,636 B1
(45) Date of Patent: *Jun. 4, 2002

(54) APPARATUS FOR SEVERING THE VENT OF SLAUGHTERED POULTRY

(75) Inventors: Tom Cornelis Jansen; Cees De Heer, both of Oostzaan (NL)

(73) Assignee: Meyn Food Processing Technology B.V., Oostzaan (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/605,260

(22) Filed: Jun. 28, 2000

(30) Foreign Application Priority Data

Jun. 29, 1999 (NL) .............................................. 1012463

(51) Int. Cl.[7] .............................................. A22C 21/06
(52) U.S. Cl. ........................................ 452/122; 452/120
(58) Field of Search ................................. 452/122, 120

(56) References Cited

U.S. PATENT DOCUMENTS

| | | | | |
|---|---|---|---|---|
| 4,023,237 A | * | 5/1977 | Meyn | 452/122 |
| 4,117,570 A | * | 10/1978 | Meyn | 452/122 |
| 4,155,146 A | * | 5/1979 | Meyn | 452/122 |
| 4,486,920 A | * | 12/1984 | Tieleman et al. | 452/122 |
| 5,133,686 A | * | 7/1992 | van den Nieuwelaar et al. | 452/122 |
| 5,141,471 A | * | 8/1992 | Bekkers | 452/122 |
| 5,181,878 A | * | 1/1993 | Bekkers | 452/122 |
| 5,199,922 A | * | 4/1993 | Korenberg et al. | 452/122 |
| 5,499,390 A | * | 3/1996 | Van Ochten et al. | 452/122 |
| 5,580,304 A | * | 12/1996 | Bleth et al. | 452/122 |

FOREIGN PATENT DOCUMENTS

| | | | |
|---|---|---|---|
| DE | 8625835 | | 12/1986 |
| EP | 0450730 A1 | * | 10/1991 |
| EP | 0722666 A1 | * | 7/1996 |
| EP | 0820697 A2 | * | 1/1998 |
| GB | 2147190 | * | 5/1985 |
| NL | 7505057 | * | 11/1976 |
| NL | 7607089 | * | 1/1978 |
| NL | 0450730 | * | 10/1991 |

* cited by examiner

Primary Examiner—Charles T. Jordan
Assistant Examiner—Kevin Jakel
(74) Attorney, Agent, or Firm—Dority & Manning, P.A.

(57) ABSTRACT

An apparatus for severing the vent of slaughtered poultry, comprising a positioning and stretching mechanism for the poultry, a centring pin to be inserted into the vent, a clamping sleeve concentrically surrounding the centring pin, and a rotary cutter concentrically surrounding the centring pin and clamping sleeve. A stretching sleeve is provided for engaging around the vent of the poultry, whereas the centring pin and the clamping sleeve have a fixed rotational position.

10 Claims, 12 Drawing Sheets

APPARATUS FOR SEVERING THE VENT OF SLAUGHTERED POULTRY

SCOPE

The invention relates to an apparatus for severing the vent of slaughtered poultry, comprising positing and stretching means for the poultry, a centring pin having a thickened end portion to be inserted into the vent and being movable in relation to the positing and stretching means, a clamping sleeve concentrically surrounding and being movable in relation to the cenetring pin for clamping the orbicular muscle surrounding the vent between same clamping sleeve and the centring pin, and a shell-shaped rotary cutter concentrically surrounding the centring pin and clamping sleeve for severing the vent.

BACKGROUND OF THE INVENTION

With the known apparatuses of this kind (which are usually but not solely equipped to process poultry while the same is suspended from an overhead conveyor), the positioning and stretching means consist substantially of one of a number of stretching brackets that engage the lower body of the poultry between or near the legs. After the poultry has been fixed with the aid of said positioning and stretching means, the centering pin with its thickened end portion is inserted into the vent. With the aid of the rotary cutter the skin is then cut around the vent after which by a relative displacement of the centring pin in relation to the clamping sleeve, the cut vent and the orbicular muscle are clamped between the clamping sleeve and the head of the centering pin. In this manner the vent and the intestines connected thereto are drawn at least partially from the poultry.

Although with this prior art apparatus there is a relative longitudinal displacement of the centering pin in relation to the clamping sleeve and the cutter, these parts of the prior art apparatus nevertheless have a fixed rotational position in relation to one another. This means that the centering pin and the clamping sleeve rotate together with the shell-shaped rotary cutter.

This known apparatus has several disadvantages. Practice has shown that the positioning and stretching means used can not always optimally guarantee that the skin surrounding the vent is pulled sufficiently tight. Consequently, it is not always possible to obtain an optimal cut (i.e. a small hole around the orbicular muscle). In some cases it is therefore necessary for the cutter to be inserted deeper into the slaughtered poultry, involving the risk of undesirable intestinal damage (whereby the intestinal contents render the meat unsuitable for consumption due to contamination). Similarly it may be necessary, if the cut made by the cutter is not complete, to partially tear the vent from the remaining part of the poultry, involving the risk of the intestine tearing.

Another disadvantage of the known apparatus arises from the fact that the centering pin and clamping sleeve rotate together with the cutter. This causes the intestine to become twisted with the possibility of the intestine tearing.

SUMMARY

It is an object of the invention to provide an apparatus of the present type with which the above-mentioned disadvantages of prior art vent cutters are eliminated in a simple yet effective manner. Additional objects and advantages of the invention will be set forth in the following description, or may be obvious from the description or may be learned through practice of the invention.

To this end, the apparatus according to the invention is characterized in that the positioning and stretching means comprise a stretching sleeve that engages around the vent of the poultry and that is positioned such that the centering pin, the clamping sleeve and the cutter can move concentrically through the same, and that the centering pin and the clamping sleeve have a fixed rotational position.

It has been shown that with the aid of such a stretching sleeve, the skin surrounding the vent can be stretched optimally while at the same time preventing the skin from rotating with the cutter. In this way the shell-shaped cutter can make an optimal cut without the cut having to be inserted deeply into the poultry. This effectively prevents damage to the intestines. The fact that the centering pin and the clamping sleeve no longer rotate with the shell-shaped cutter but remain in a fixed position, also plays a role. Only the mutual longitudinal movement between the centering pin on the one hand and the clamping sleeve and the shell-shaped cutter on the other hand is possible.

By choosing a suitable shape for the stretching sleeve, it is possible to ensure that the same will make optimal contact with poultry having a very slack abdominal skin. Practice has shown that this makes the apparatus suitable for the best possible manner of processing poultry whose live weight comes within a greater range, for example, when the apparatus is set at 1500 to 2500 grams as opposed to 1800 to 2200 grams in the case of the known apparatus of this type.

In a preferred embodiment of the apparatus according to the invention, the cutter has a smooth cutting edge and a high rotational speed.

In the prior art apparatus the cutter has a low rotational speed (for example, 150 revolutions per minute) and the cutting edge is serrated. The combination of a low rotational speed and a serrated cutting-edge results in tearing the vent, ensuing in an irregular cut and possible intestinal damage. However, providing the cutter with a smooth edge and rotating it at high speed, results in a smooth cutting edge and minimizes the risk of intestinal damage. The prior art apparatus was not capable of a high rotational speed because the centering pin and the clamping sleeve rotated together with the shell-shaped cutter, and because a high rotational speed would result in unacceptable twisting of the intestine. However, as in accordance with the invention the centering pin and the clamping sleeve do not rotate, the cutter may have a high rotational speed without thereby causing the intestine to become twisted.

Within this framework it is preferred for the cutter to make at least 1000 revolutions per minute.

As already briefly mentioned in the above, the shape of the stretching sleeve is designed such as to allow optimal operation. For example, in a special variant of the apparatus according to the invention, the stretching sleeve is at the side that during use faces the tailbones of the poultry, preferably provided with a bevel. This ensures that this side also is properly in contact with the poultry.

BRIEF DESCRIPTION OF THE DRAWINGS

The invention will now be elucidated with reference to the drawings in which.

DETAILED DESCRIPTION

Figure 1:
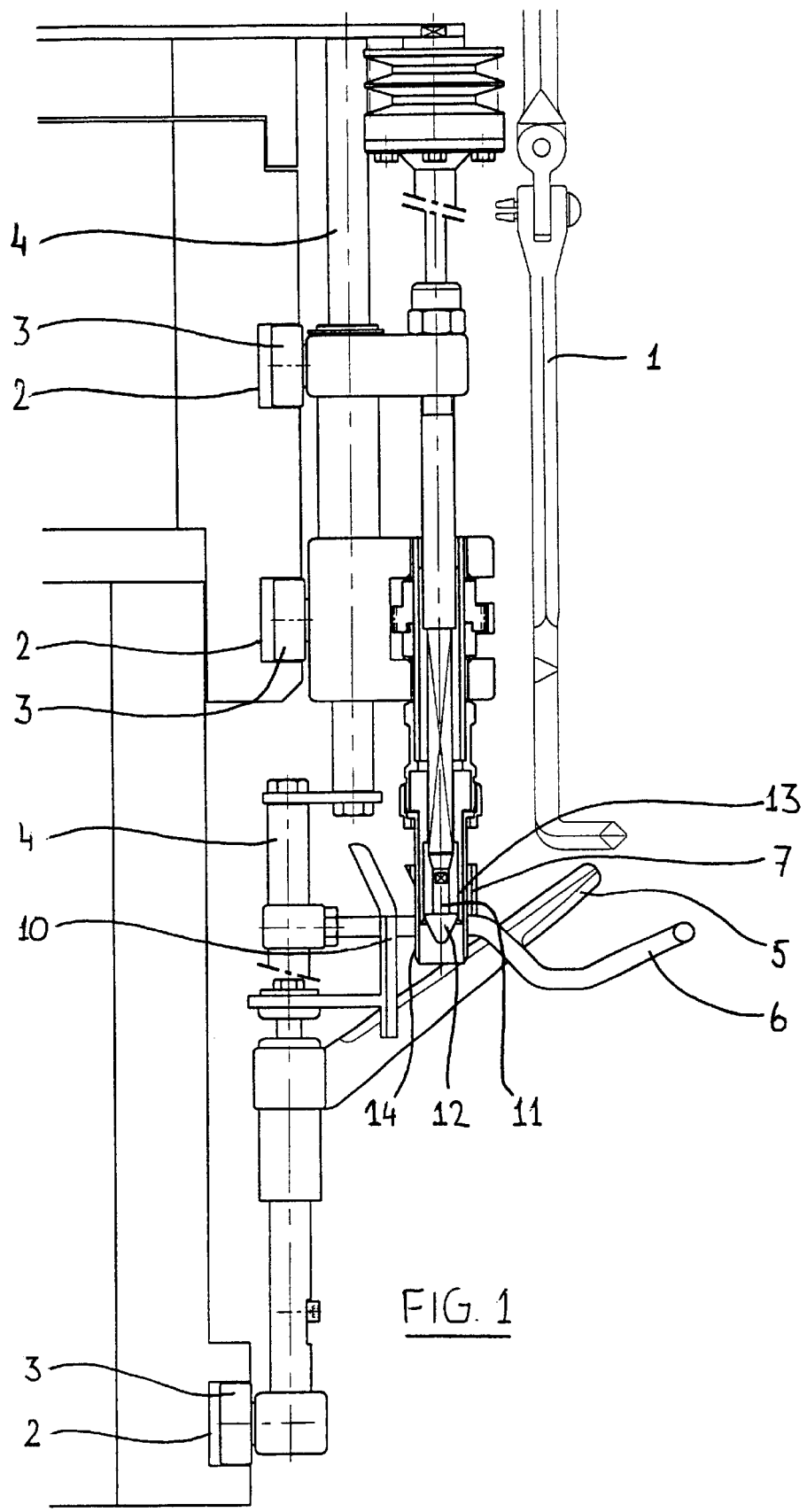
FIG. 1, shows partly in a side view and partly in cross section a portion of an embodiment of the apparatus according to the invention.

Reference will now be made in detail to embodiments of the invention, one or more examples of which are shown in the drawings. Each example is provided to explain the invention, and not as a limitation of the invention. For example, features illustrated or described as part of one embodiment may be used on another embodiment to yield still a further embodiment. It is intended that the present invention include such modifications and variations.

FIG. 1, shows a portion of the embodiment of the apparatus according to the invention in a side view and partially in cross section. In this case the apparatus interacts with a conventional overhead conveyor with carrying hooks 1 from which the slaughtered poultry is suspended by the legs. Such an overhead conveyor is known itself and does not require any further explanation.

As usual with apparatuses for the processing of slaughtered poultry, a turret-like apparatus may be provided with, distributed over its circumference, a number of processing stations, only one of which is represented in FIG. 1. Such a turret-like apparatus comprises curved tracks 2 able to interact with tracking runners 3 to effect various movements of parts of the apparatus. For this purpose, such parts may be slidable along guides 4 of the like. The interaction between such curved tracks 2 and tracking runners 3 is know with turret-like apparatuses of this kind, and down not require any further explanation.

A lower portion of the apparatus for the removal of the vent of slaughtered poultry is provided with positioning and stretching means for the poultry. This includes brackets 5 engaging the legs and a U-shaped bracket 6 engaging the lower body of the poultry. The dimensions and geometry of said brackets 5 and 6 are adapted to the body geometry of the poultry in which the poultry is supplied by the carrier hook 1, is also taken into consideration.

As will be seen later, the U-shaped bracket 6 occupies a permanent position, whereas the brackets 5 move up and down along the lower guide 4 as a result of the interaction between the respective tracking runner 3 and curved track 2.

Figure 3:
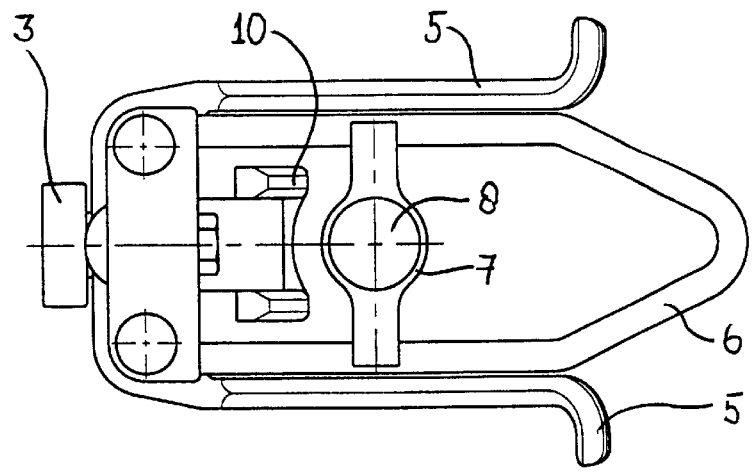
FIG. 3, shows a top view of the portion shown in FIG. 2.
Figure 2:
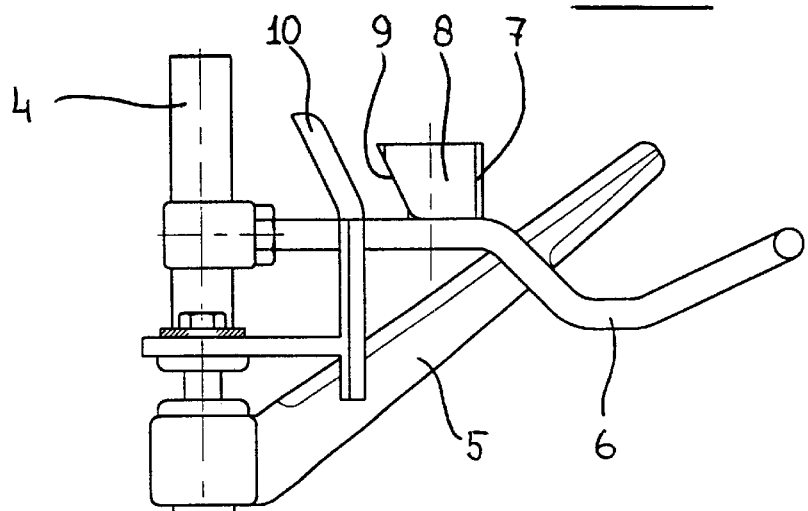
FIG. 2, shows in a side view the lower portion of the apparatus depicted in FIG. 1.

The positioning and stretching means further include a stretching sleeve 7 that can be clearly seen in FIG. 2 and FIG. 3. This stretching sleeve is attached to the U-shaped bracket 6 in such a manner that in an operational position, the same will engage the lower body of the poultry around the vent. The skin surrounding the vent will thus become stretched tight.

The stretching sleeve 7 possesses a through-opening 8, through which parts of the apparatus can extend, as will be described later.

A side of the stretching sleeve 7 that, during operation of the apparatus faces toward the tail bone of the poultry to be processed, is provided with a bevel 9. In this way the stretching sleeve 7 is optimally adjusted to the local body geometry of the poultry to be processed.

The positioning and stretching means may further include a support plate 10, which serves to support the back of the poultry to be processed.

Figure 4:
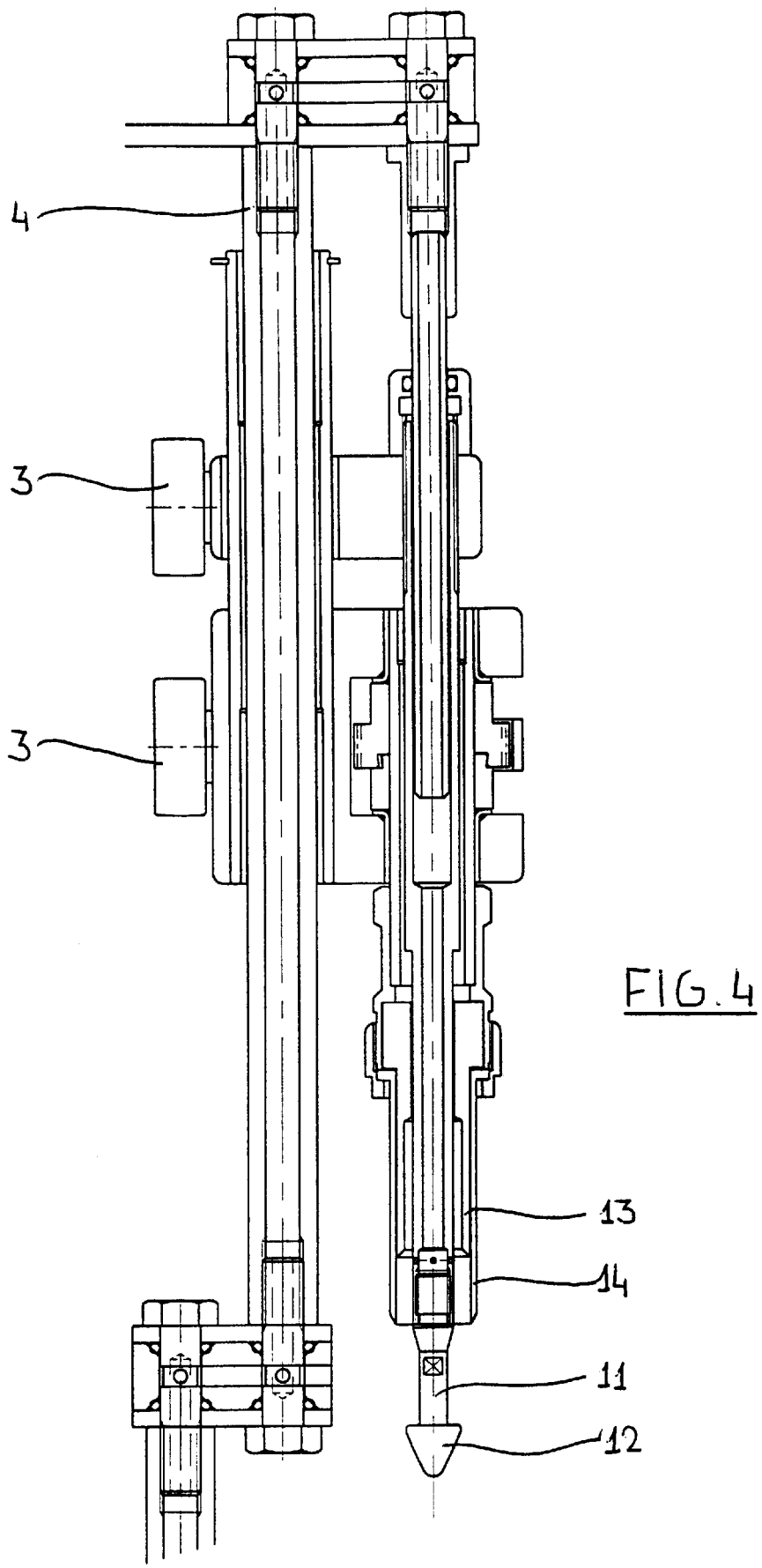
FIG. 4, shows substantially in cross section the upper portion of the apparatus depicted in FIG. 1.

With reference to FIG. 1, but in particular also to the enlarged representation in accordance to FIG. 4, the apparatus is also provided with an upper portion comprising, among other things, a centering pin 11 having a thickened end portion 12 that can be moved up and down in the vertical direction, a clamping sleeve 13 concentrically surrounding the centering pin, as well as a shell-shaped cutter 14 concentrically surrounding both the centering pin 11 and the clamping sleeve 13.

The movements effected by the interaction between the tracking runners 3 and curved tracks 2 are such that the centering pin 11 with the thickened end 12 can move longitudinally in relation to the clamping sleeve 13 and the shell-shaped cutter 14. In the same longitudinal direction, the clamping sleeve 13 and the shell-shaped cutter 14 are in a fixed position in relation to one another.

According to common usage, the shell-shaped cutter 14 is rotatingly driven by means that are not explained in detail. As will be explained later, this makes it possible for the shell-shaped cutter to sever the vent according to the invention the sequence is chosen such that the centering pin 11 and the clamping sleeve 13 do not rotate, thus have a fixed rotational position. When the apparatus is in use, only the shell-shaped cutter 14 will rotate.

The external diameter of the shell-shaped cutter 14 is such as to allow it to project through the opening 8 of the stretching sleeve 7 of the lower portion of the apparatus.

The working of the apparatus will now be explained in more detail with reference to the FIGS. 5 to 11. It should be noted, that FIG. 5a corresponds with FIG. 6, FIG. 5b with FIG. 7, FIG. 5c with FIG. 8, FIG. 5d with FIG. 9, FIG. 5e with FIG. 10, and FIG. 5f with FIG. 11. The poultry is not shown in FIG. 5.

Figure 5A:
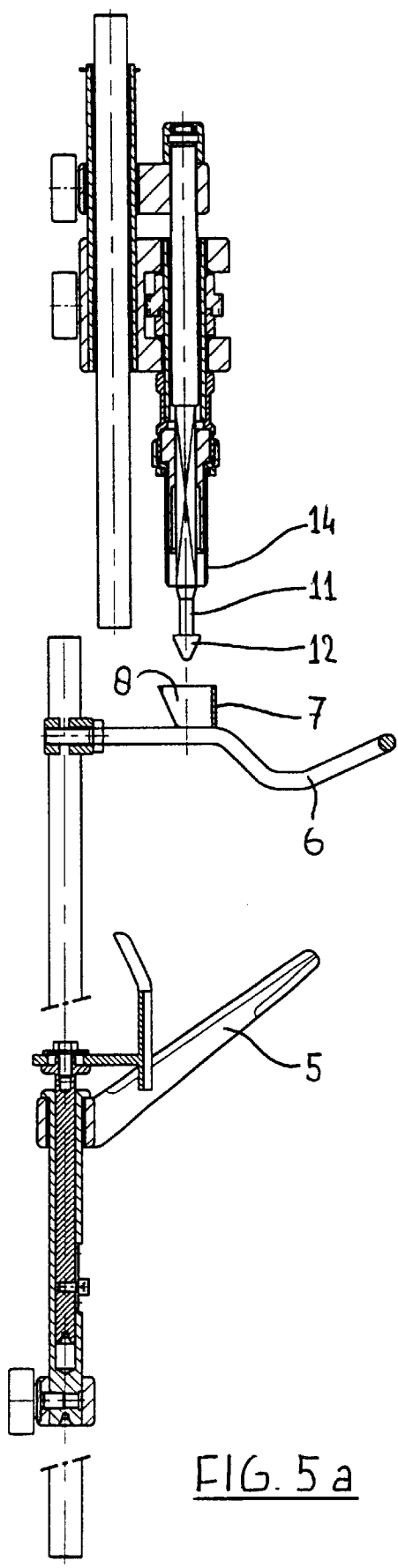
FIG. 5 shows the apparatus in six successive operational phases.
Figure 5B:
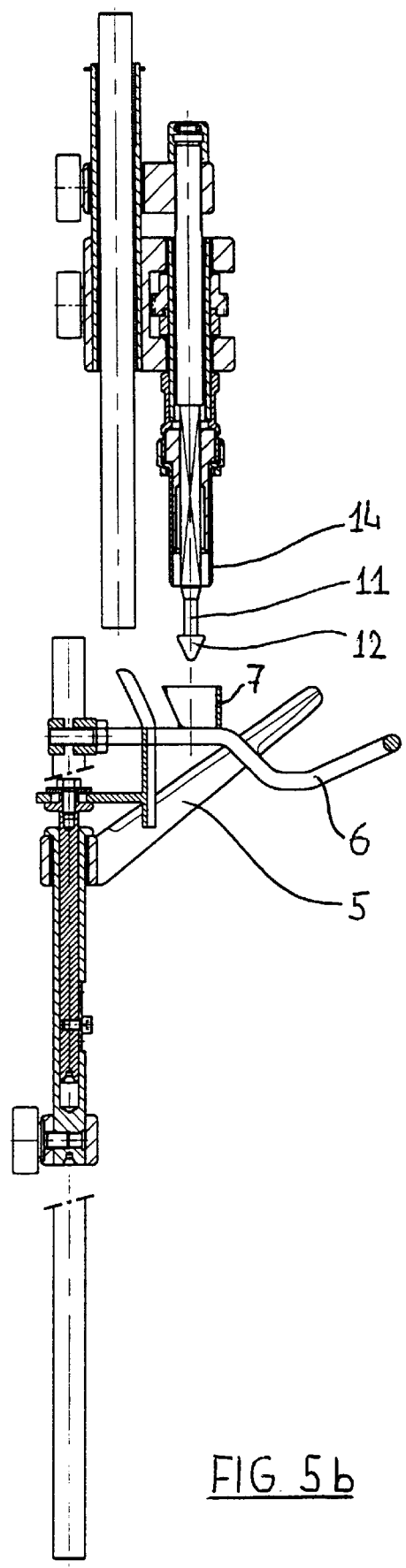

FIG. 5a (and FIG. 6) shows the position in which the poultry 15 is not yet stretched by the brackets 5 and 6. The centering pin 11, the thickened end portion 12, clamping sleeve 13 and shell-shaped cutter 14 are still at some distance above the stretching sleeve 7. FIG. 5b (and FIG. 7) shows the position in which the poultry 15 to be processed and that is suspended by its legs 16 in the carrier hooks 1 of the overhead conveyor, is positioned with its lower body against the U-shaped bracket 6. For this purpose the brackets 5 are moved upwards. The stretching sleeve 7 is positioned around the vent 17 such that the skin surrounding said vent 17 is stretched tight and the vent is lifted upward. The bevel 9 of the stretching sleeve 7 matches the natural geometry of the poultry, namely the tailbones 18. The brackets 5 engage the legs 16. The centring pin 11 having a thickened end portion 12, the clamping sleeve 13, and the shell-shaped cutter 14, are still positioned at some distance above the stretching sleeve 7.

Figure 5C:
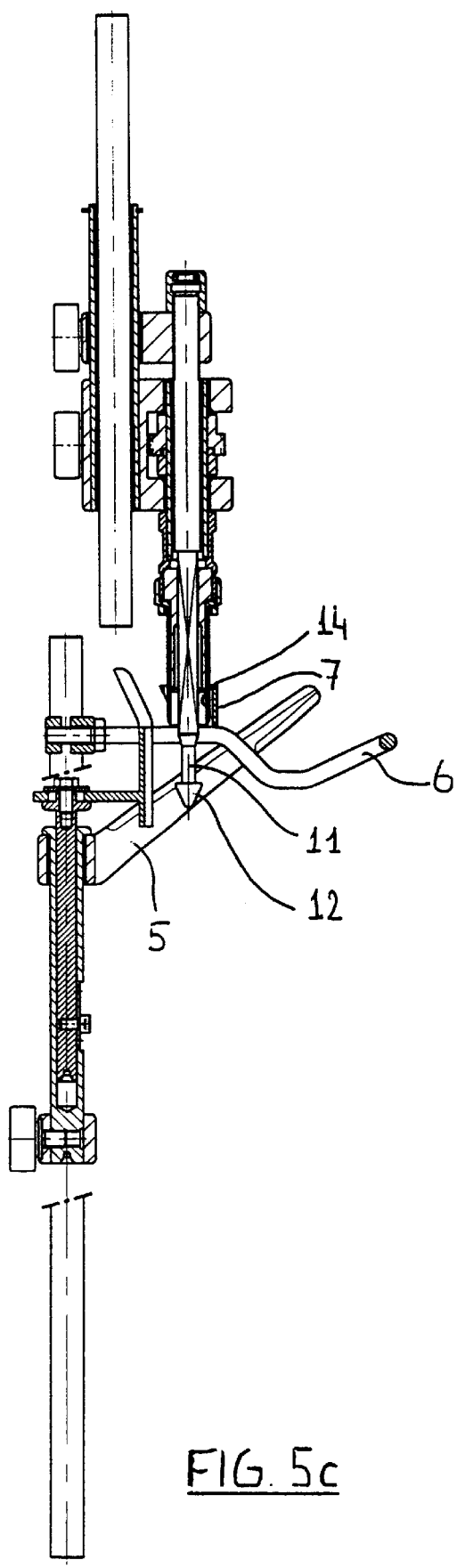
Figure 5D:
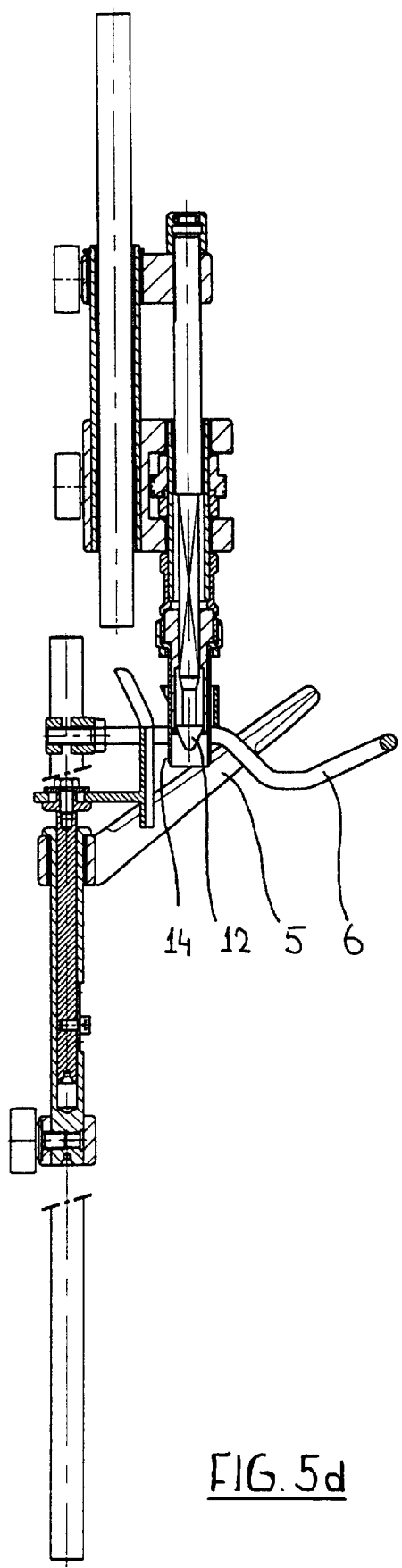

FIG. 5c (and FIG. 8) shows the operational condition of the apparatus, in which the centering pin 11, with the thickened end portion 12, is inserted into the vent of the poultry. The shell-shaped cutter 14 is about to engage the skin surrounding the vent. The orbicular muscle 18 of the vent is clearly visible.

In this situation the shell-shaped cutter 14, and the centring pin 11 (and to a lesser extent the clamping sleeve 13) extend through the opening 8 of the clamping sleeve 7.

Under the influence of the previously-mentioned interaction between the various tracking runners 3 and curved tracks 2, the rotatingly driven shell-shaped cutter 14 then moves (in a manner not shown) further downward, severing the vent around the orbicular muscle 18. As mentioned earlier, the shell-shaped cutter 14 and the clamping sleeve 13 occupy a mutual permanent longitudinal position. This means, that when moving the shell-shaped cutter 14 downward, the clamping sleeve 13 is moved downward also. By simultaneously making an upward movement with the centring pin 11 and its thickened end portion 12, the situation shown in FIG. 9 (and FIG. 5d) is reached, wherein the circumference of the thickened end portion 12 of the centring pin 11 cooperates with the internal circumference of the clamping sleeve 13 to hereby enclose the orbicular muscle 18.

While severing the vent, the shell-shaped cutter 14 rotates at high speed, for example, 2000 rotations per minute. However, the centring pin 11 and the clamping sleeve 13 do not rotate. This prevents the vent from rotating and the intestines 19 connected to the vent from twisting and possibly tearing.

Figure 5E:
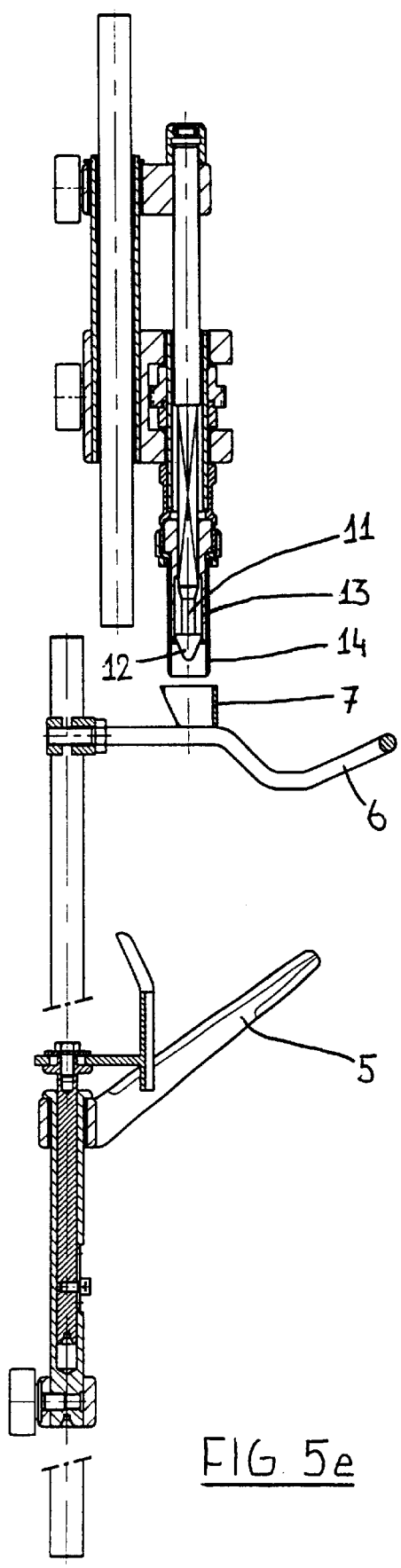
Figure 5F:
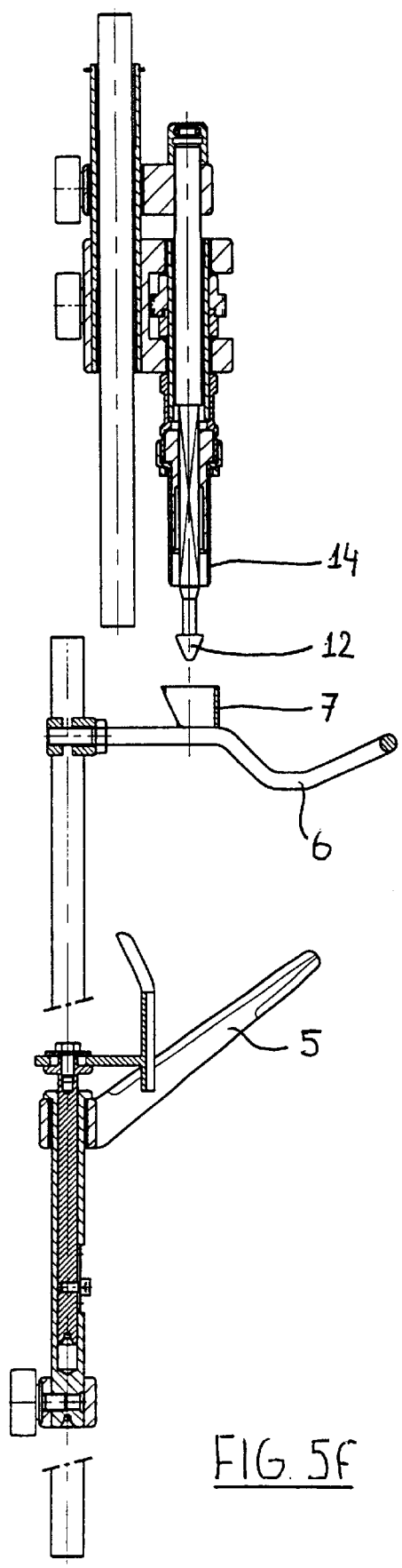
Figure 6:
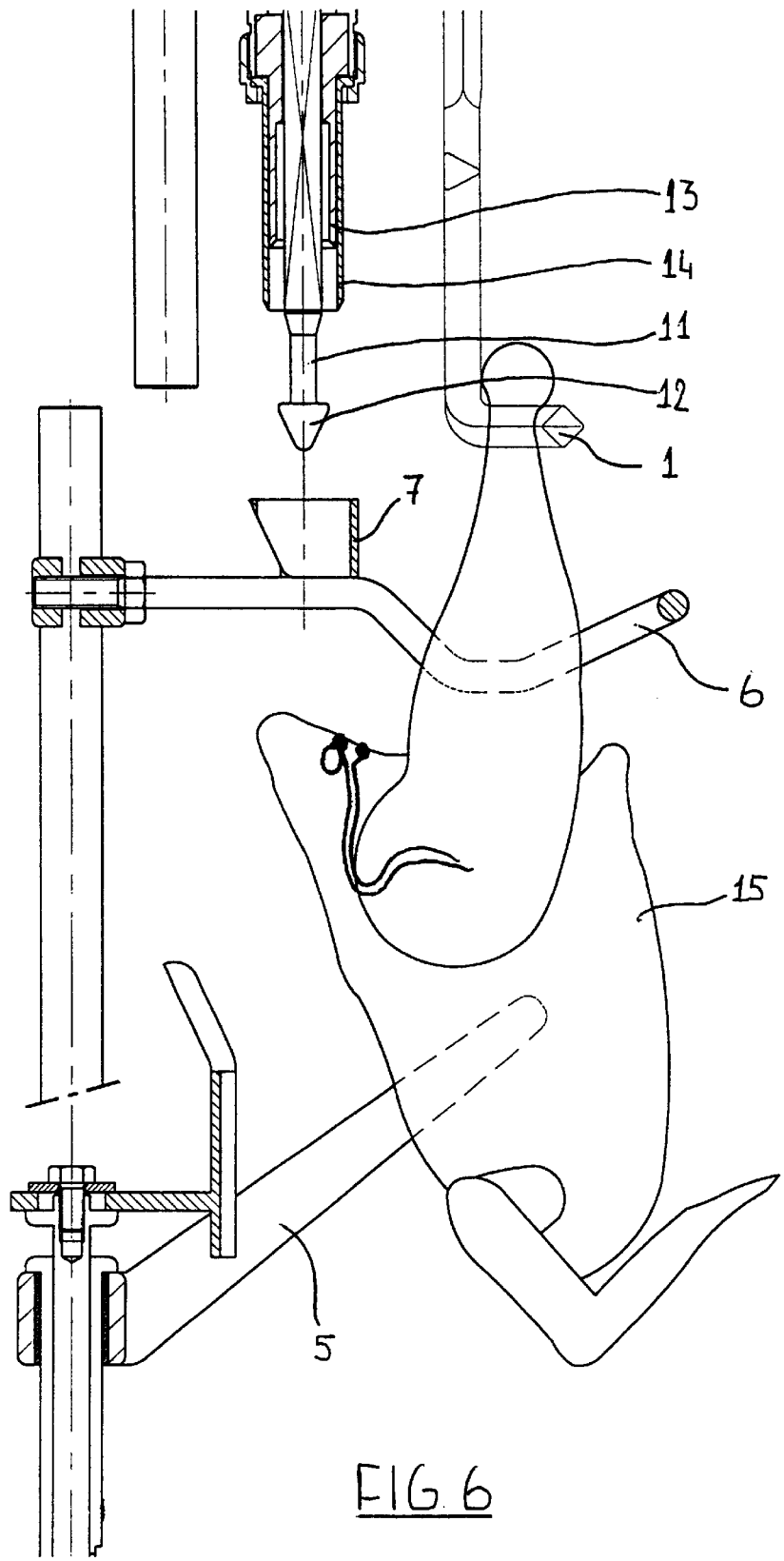
FIGS. 6 to 11, show on a larger scale the phases depicted in FIG. 5.
Figure 7:
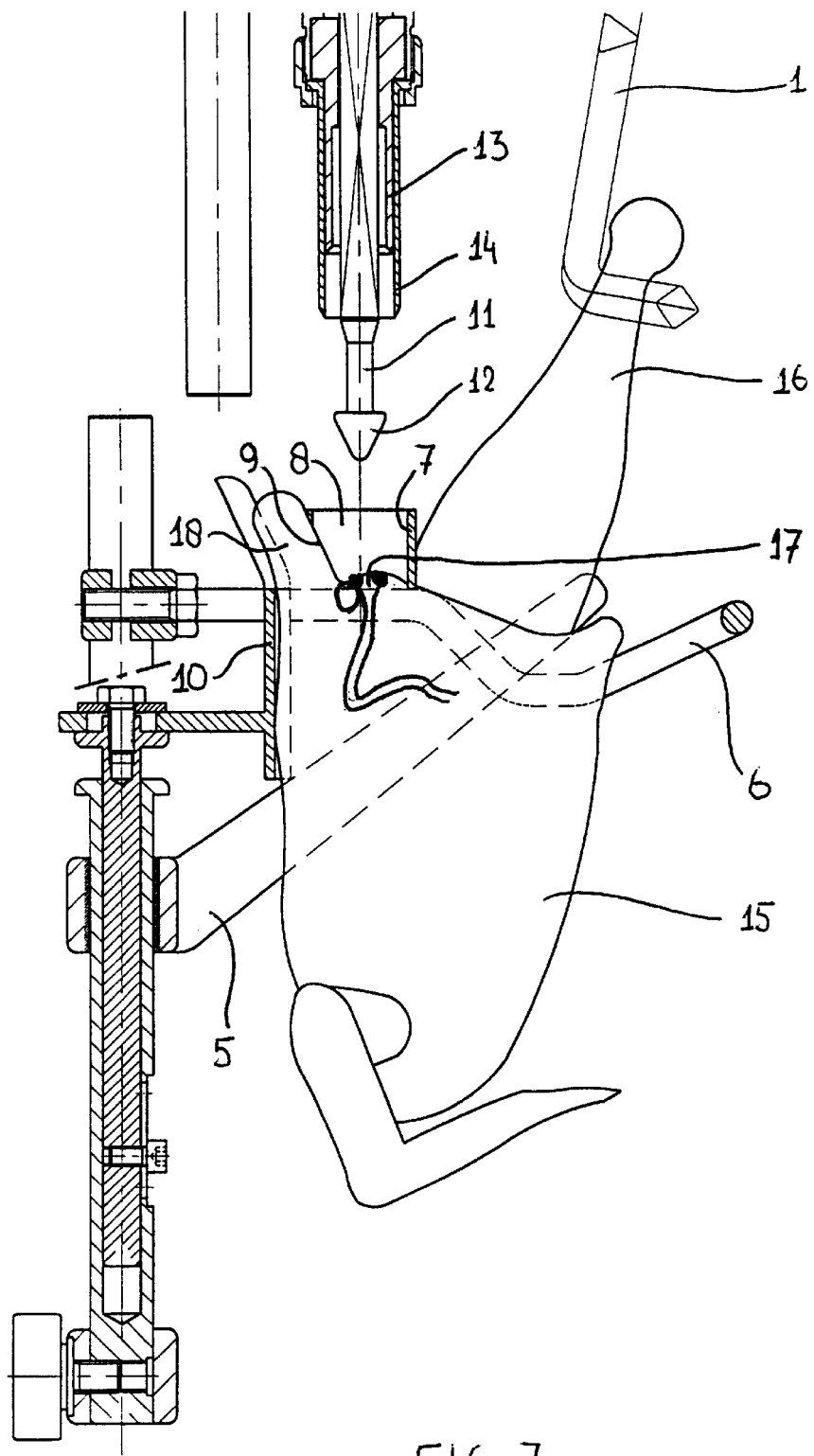
Figure 8:
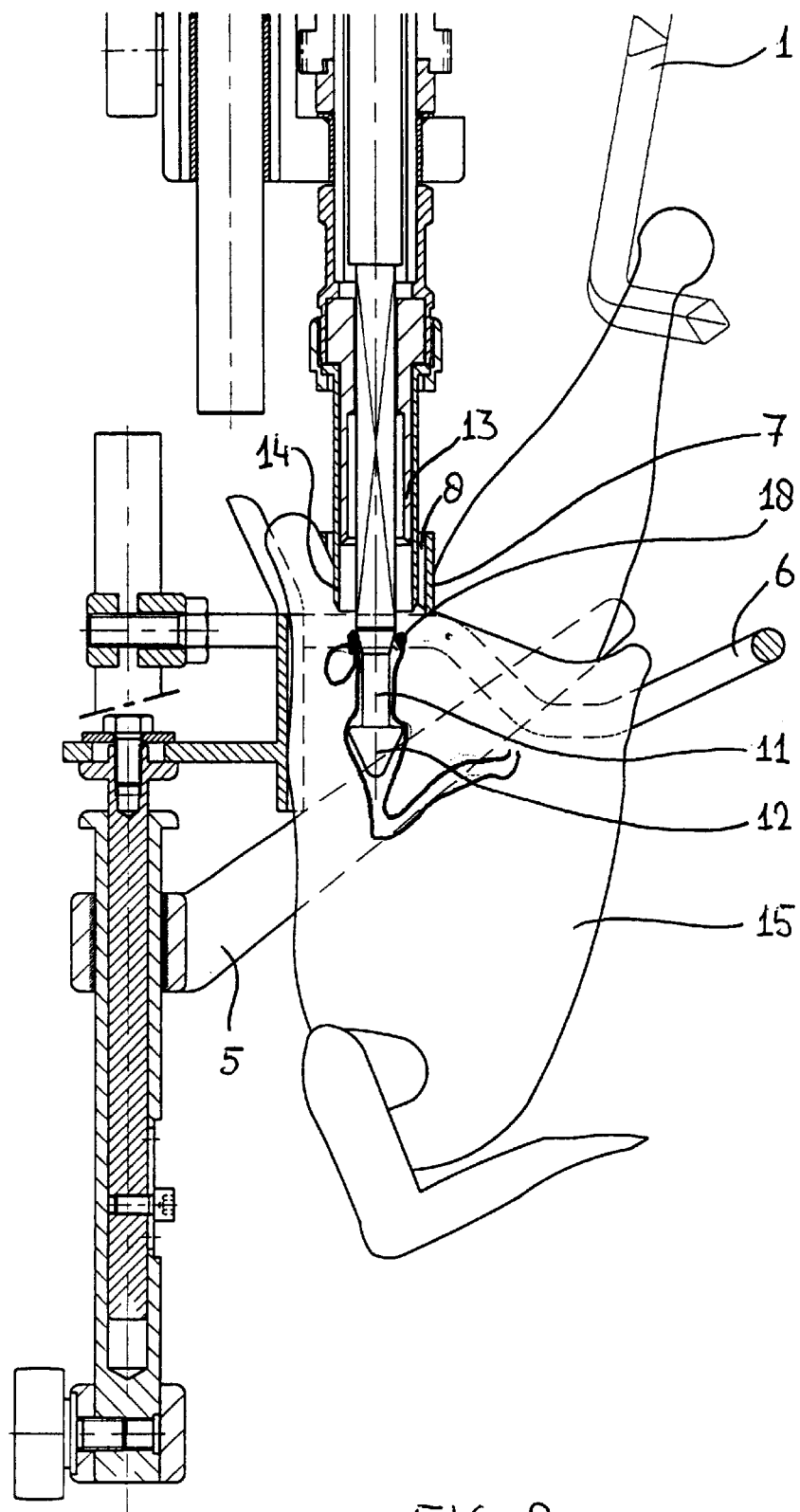
Figure 9:
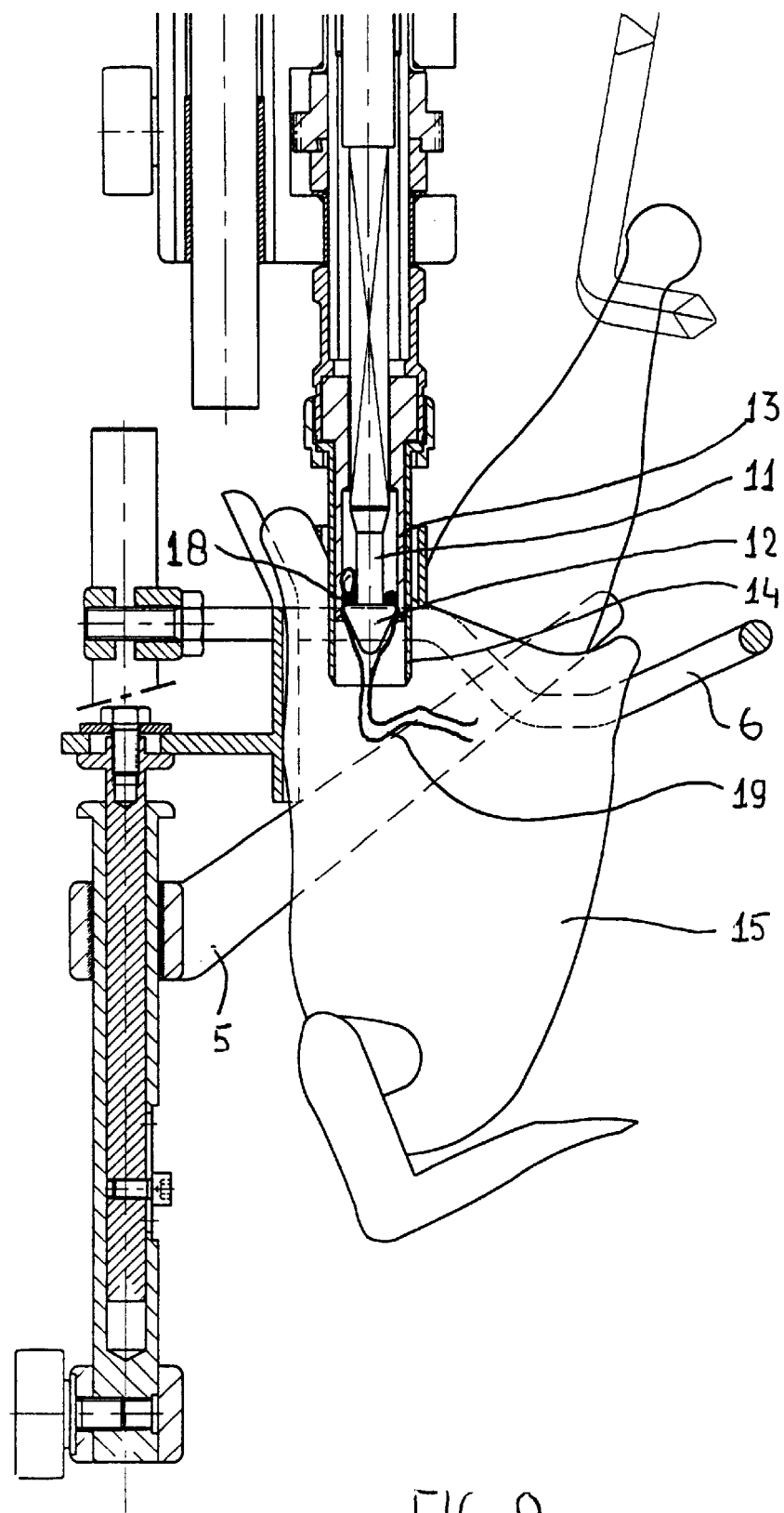
Figure 10:
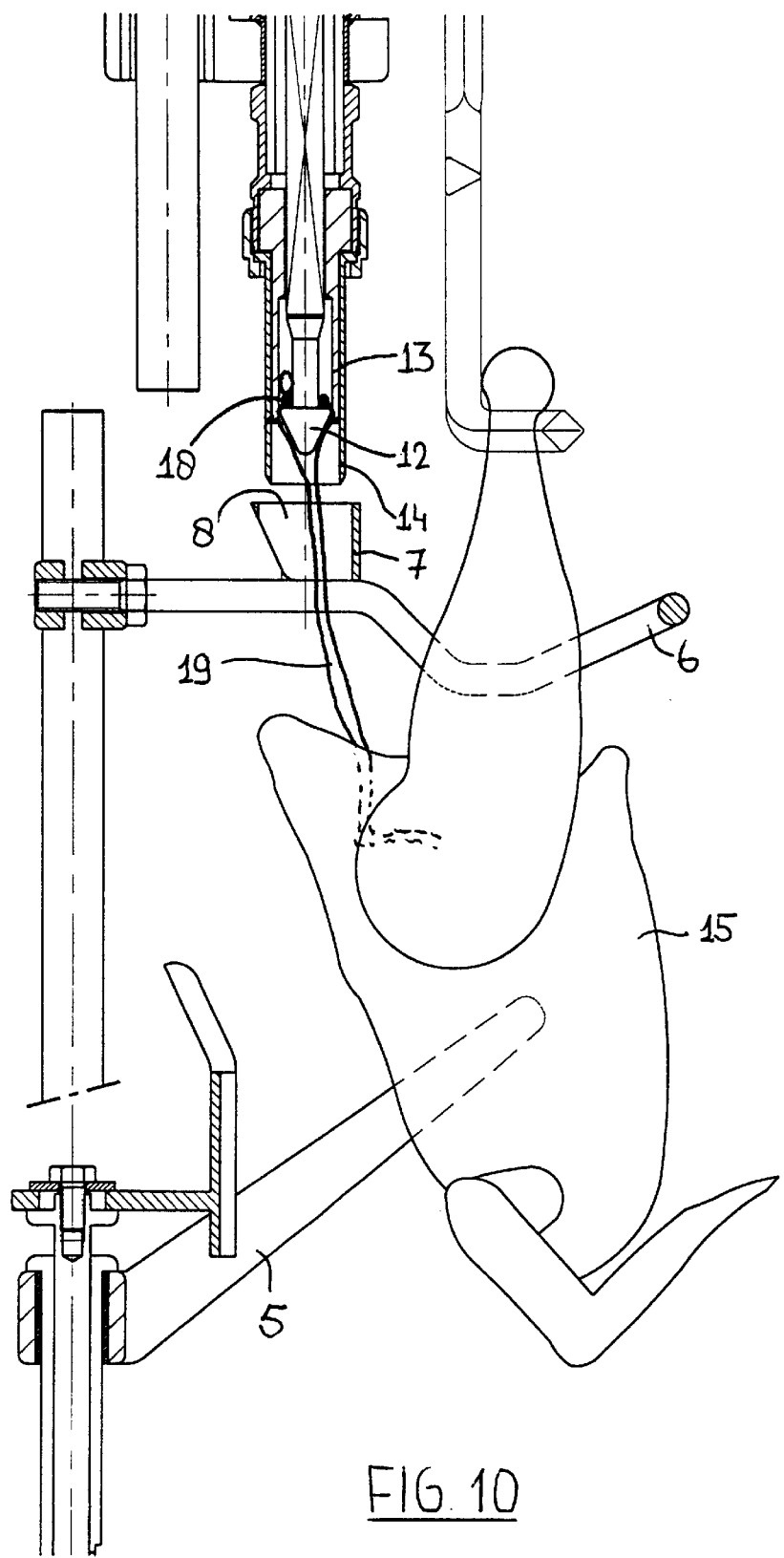

After the vent has been severed in the manner shown in FIG. 9 (and thus also in FIG. 5d) and the orbicular muscle 18 has been enclosed, the assembly comprising centring pin 11, clamping sleeve 13, and shell-shaped cutter 14, is moved upwards out of the clamping sleeve 7 into the position shown in FIG. 5e and FIG. 10. The orbicular muscle 18 remains enclosed between the thickened end portion 12 of the centring pin 11 and the clamping sleeve 13. The intestine 19 is thereby partially extracted from the abdominal cavity of the poultry. As is apparent also, the bracket 5 may already be moved downward during this phase.

Figure 11:
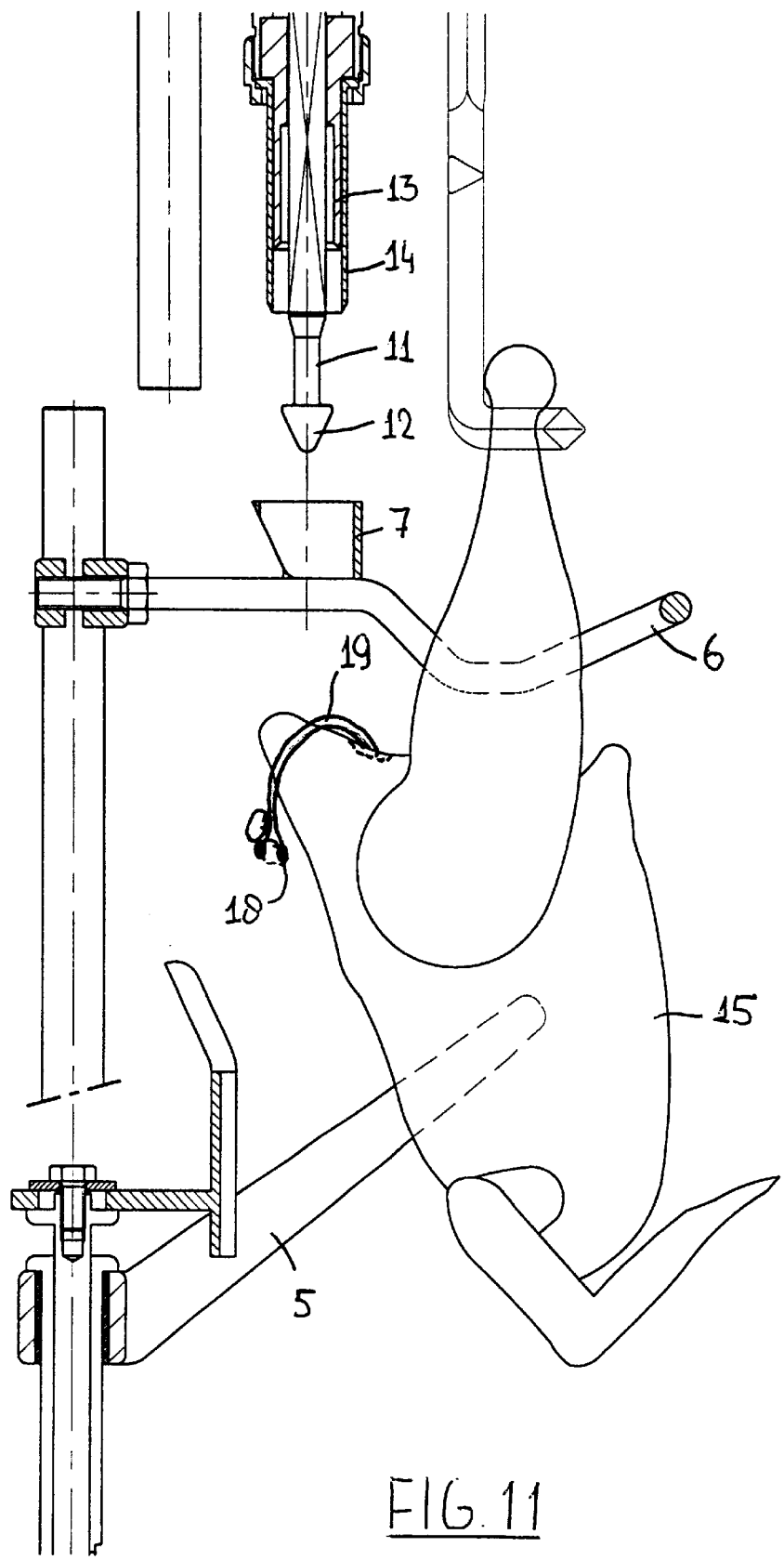

Basically, the removal of the vent of the poultry is now completed. Optionally, as shown in FIG. 5 and FIG. 11, the centring pin 11 may be partially moved downwards again (or the clamping sleeve 13 may be moved upwards), releasing the orbicular muscle 18, and allowing it to slide down over the thickened end portion 12 of the centring pin 11. In this way the intestine is placed over the back of the poultry. In the embodiment shown, the shell-shaped cutter 14 used in the apparatus according to the present invention has a smooth cutting edge. It is possible to use such a smooth cutting edge because the shell-shaped cutter 14 is capable of a high rotational speed. Since the centring pin 11 and the clamping sleeve 13 do not rotate, there is no fear of the intestine 19 becoming twisted (with the risk of tearing) due to the rotation of the shell-shaped cutter 14. In the conventional apparatus the centring pin and the clamping sleeve rotate together with the shell-shaped cutter, making it necessary to operate at a low rotational speed in order to reduce the twisting effect. This generally means that the cutter has to be serrated in order for it to be able to cut adequately. However, this serration entails the risk of undesirable intestinal damage.

With the aid of the stretching sleeve 7, the skin surrounding the vent is stretched, always allowing the performance of an optimal cut. This means that the shell-shaped cutter 14 does not need to be inserted into the abdominal cavity of the poultry deeper than necessary, which further reduces the risk of intestinal damage. Also, this method permits the best possible processing of poultry with slack abdominal skin.

The invention is not limited to the above embodiment which, within the framework of the invention specified by the appended claims, may be varied in numerous ways.

What is claimed is:

1. An apparatus for severing the vent of slaughtered poultry, comprising
    positioning and stretching means for the poultry,
    a centring pin having a thickened end portion to be inserted into the vent and being movable in relation to the positioning and stretching means,
    a clamping sleeve concentrically surrounding and being movable in relation to the centring pin for clamping the orbicular muscle surrounding the vent between same clamping sleeve and the centring pin,
    and a shell-shaped rotary cutter concentrically surrounding the centring pin and clamping sleeve, for severing the vent,
    characterized in that
        the positioning and stretching means comprise a stretching sleeve that engages around the vent of the poultry and that is positioned such that the centring pin, the clamping sleeve and the cutter can move concentrically through the same, and in that
        the centring pin and the clamping sleeve have a fixed rotational position.

2. An apparatus according to claim 1,
    characterized in that
        the cutter has a smooth cutting edge and a high rotational speed.

3. An apparatus according to claim 2,
    characterized in that
        the cutter makes at least 1000 revolutions per minute.

4. An apparatus according to one of the preceeding claims
    characterized in that
        at the side that during use faces the tailbones of the poultry, the stretching sleeve is provided with a bevel.

5. An apparatus for severing the vent of slaughtered poultry, comprising:
    a centering pin having a thickened end portion, said centering pin movable into a vent of a slaughtered poultry;
    a clamping sleeve concentrically surrounding and longitudinally movable relative to said centering pin such that the orbicular muscle of the slaughtered poultry is clamped between said clamping sleeve and said thickened portion upon insertion and withdraw of said clamping sleeve and centering pin from the poultry vent;
    a rotary cutter concentrically disposed around said centering pin and said clamping sleeve;
    a stretching sleeve configured to engage around the poultry vent, said stretching sleeve disposed such that said centering pin, said clamping sleeve, and said rotary cutter move through said stretching sleeve upon insertion and withdraw from poultry vent; and
    wherein said centering pin and said clamping sleeve are rotationally fixed relative to each other, and said rotary cutter is rotatable relative to said centering pin and said clamping sleeve for severing the poultry vent in a rotational cutting operation.

6. The apparatus as in claim 5, further comprising means for positioning and stretching the poultry relative to said stretching sleeve in position such that said centering pin, said clamping sleeve, and said rotary cutter are insertable and withdrawable from the poultry vent.

7. The apparatus as in claim 5, wherein said rotary cutter has a substantially smooth cutting edge.

8. The apparatus as in claim 5, wherein said rotary cutter is rotatable at about 1000 rpm.

9. The apparatus as in claim 5, wherein said rotary cutter is rotatable at about 2000 rpm.

10. The apparatus as in claim 5, wherein said stretching sleeve further comprises a bevel surface at a side thereof facing the poultry tailbone.

* * * * *